US012675700B2

(12) United States Patent
Imani

(10) Patent No.: US 12,675,700 B2
(45) Date of Patent: Jul. 7, 2026

(54) ARTIFICIAL INTELLIGENCE FRAMEWORK COMBINING A SPIKING NEURAL NETWORK AND A HYPERDIMENSIONAL COMPUTING BLOCK

(71) Applicant: The Regents of the University of California, Oakland, CA (US)

(72) Inventor: Mohsen Imani, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 825 days.

(21) Appl. No.: 17/895,171

(22) Filed: Aug. 25, 2022

(65) Prior Publication Data

US 2023/0071730 A1 Mar. 9, 2023

Related U.S. Application Data

(60) Provisional application No. 63/237,645, filed on Aug. 27, 2021.

(51) Int. Cl.
| | |
|---|---|
| *G06F 7/00* | (2006.01) |
| *G06F 16/00* | (2019.01) |
| *G06N 3/084* | (2023.01) |
| *G06N 5/022* | (2023.01) |

(52) U.S. Cl.
CPC ............. *G06N 3/084* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 11,244,723 B1 | 2/2022 | Karunaratne et al. | |
| 11,409,752 B1 | 8/2022 | Qadrud-Din et al. | |
| 11,455,161 B2 | 9/2022 | Prasad et al. | |
| 11,574,209 B2 * | 2/2023 | Karunaratne ......... | G06N 20/00 |
| 2018/0101784 A1 | 4/2018 | Rolfe et al. | |
| 2019/0370598 A1 * | 12/2019 | Martin ................... | G06V 10/82 |
| 2020/0242774 A1 | 7/2020 | Park et al. | |
| 2020/0279129 A1 * | 9/2020 | Batchelor ............ | G05B 13/027 |
| 2020/0410404 A1 | 12/2020 | Imani et al. | |
| 2021/0287141 A1 * | 9/2021 | Molloy .................. | G06F 18/22 |
| 2021/0326756 A1 | 10/2021 | Khaleghi et al. | |
| 2021/0327376 A1 | 10/2021 | Srinivasa | |
| 2021/0334703 A1 | 10/2021 | Salamat et al. | |
| 2021/0383199 A1 * | 12/2021 | Weissenborn ......... | G06N 3/063 |
| 2022/0019441 A1 | 1/2022 | Rosing et al. | |

(Continued)

OTHER PUBLICATIONS

Non-Final Office Action for U.S. Appl. No. 17/744,371, mailed Jun. 23, 2023, 17 pages.

(Continued)

*Primary Examiner* — Tuan A Pham
(74) *Attorney, Agent, or Firm* — Withrow & Terranova, PLLC

(57) ABSTRACT

An artificial intelligence framework is disclosed having a spiking neural network configured to extract low-level features from event-based spiking data and provide the low-level features as a spiking neural network output signal. Further included is a hyperdimensional computing block that is configured to map the spiking neural network output into high-dimensional space and classify data from the abstract information.

18 Claims, 9 Drawing Sheets

(56)             References Cited

U.S. PATENT DOCUMENTS

| | | | |
|---|---|---|---|
| 2022/0121931 A1 | 4/2022 | Kalarot et al. | |
| 2022/0147758 A1 | 5/2022 | Hiromoto | |
| 2022/0198782 A1* | 6/2022 | Zhang | G06N 3/063 |
| 2023/0047478 A1* | 2/2023 | Brito | G06N 3/084 |

OTHER PUBLICATIONS

Notice of Allowance for U.S. Appl. No. 17/895,177, mailed Feb. 28, 2024, 8 pages.

Alaghi, A. et al., "The Promise and Challenge of Stochastic Computing," IEEE Transactions on Computer-Aided Design of Integrated Circuits and Systems, vol. 37, Issue 8, Aug. 2018, IEEE, 19 pages.

Alaghi, A. et al., "Survey of Stochastic Computing," ACM Transactions on Embedded Computing Systems, vol. 12, Issue 2s, Article No. 92, May 2013, 19 pages.

Angelova, A. et al., "Pruning training sets for learning of object categories," 2005 IEEE Computer Society Conference on Computer Vision and Pattern Recognition (CVPR'05), Jun. 20-25, 2005, San Diego, CA, USA, IEEE, 8 bages.

Anguita, D. et al., "Human Activity Recognition on Smartphones Using a Multiclass Hardware-Friendly Support Vector Machine," Proceedings of the 4th International Conference on Ambient Assisted Living and Home Care, Dec. 2012, 8 pages.

Bonomi, F. et al., "Fog computing and its role in the internet of things," MCC '12: Proceedings of the First Edition of the MCC workshop on Mobile Cloud Computing, Aug. 2012, ACM, pp. 13-15.

Ciresan, D. et al., "Multi-column Deep Neural Networks for Image Classification," IEEE Computer Society Conference on Computer Vision and Pattern Recognition, Feb. 2012, 8 pages.

Chen, X.-W. et al., "Big Data Deep Learning: Challenges and Perspectives," IEEE Access, vol. 2, May 2014, IEEE, 12 pages.

Chi, P. et al., "Prime: A Novel Processing-in-Memory Architecture for Neural Network Computation in ReRAM-Based Main Memory," 2016 ACM/IEEE 43rd Annual International Symposium on Computer Architecture (ISCA), Jun. 18-22, 2016, Seoul, South Korea, IEEE, 13 pages.

Dua, D. et al., "UCI Machine Learning Repository," 2019, University of California, School of Information and Computer Science, Irvine, CA, [http://archive.ics.uci.edu/ml], 2 pages.

Hernandez-Cano, A. et al., "OnlineHD: Robust, Efficient, and Single-Pass Online Learning Using Hyperdimensional System," 2021 Design, Automation & Test in Europe Conference & Exhibition, Feb. 1-5, 2021, Grenoble, France, IEEE, 6 pages.

Hou, S. et al., "DualNet: Learn Complementary Features for Image Recognition," 2017 IEEE International Conference on Computer Vision (ICCV), Oct. 22-29, 2017, Venice, Italy, IEEE, 9 pages.

Imani, M. et al., "A Framework for Collaborative Learning in Secure High-Dimensional Space," 2019 IEEE 12th International Conference on Cloud Computing (CLOUD), Jul. 8-13, 2019, Milan, Italy, IEEE, 12 pages.

Imani, M. et al., "DUAL: Acceleration of Clustering Algorithms using Digital-based Processing In-Memory," 2020 53rd Annual IEEE/ACM International Symposium on Microarchitecture (MICRO), Oct. 17-21, 2020, Athens, Greece, IEEE, 16 pages.

Imani, M. et al., "FloatPIM: In-Memory Acceleration of Deep Neural Network Training with High Precision," 2019 ACM/IEEE 46th Annual International Symposium on Computer Architecture (ISCA), Jun. 22-26, 2019, Phoenix, AZ, USA, IEEE, 14 pages.

Imani, M. et al., "Revisiting HyperDimensional Learning for FPGA and Low-Power Architectures," 2021 IEEE International Symposium on High-Performance Computer Architecture (HPCA), Feb. 27-Mar. 3, 2021, Seoul, South Korea, IEEE, 14 pages.

Imani, M. et al., "SearcHD: A Memory-Centric Hyperdimensional Computing With Stochastic Training," IEEE Transactions on Computer-Aided Design of Integrated Circuits and Systems, vol. 39, Issue 10, Oct. 2020, first published Nov. 2019, IEEE, 13 pages.

Jouppi, N. et al., "In-Datacenter Performance Analysis of a Tensor Processing Unit," ISCA '17: Proceedings of the 14th Annual International Symposium on Computer Architecture, Jun. 2017, ACM, 12 pages.

Kanerva, P., "Hyperdimensional Computing: An Introduction to Computing in Distributed Representation with High-Dimensional Random Vectors," Cognitive Computation, vol. 1, No. 2, Jan. 2009, Springer Science +Business Media, LLC, 21 pages.

Kim, K. et al., "Dynamic energy-accuracy trade-off using stochastic computing in deep neural networks," 2016 53nd ACM/EDAC/IEEE Design Automation Conference (DAC), Jun. 5-9, 2016, Austin, TX, USA, IEEE, 6 pages.

Kotra, J. et al., "Re-NUCA: A Practical NUCA Architecture for ReRAM Based Last-Level Caches," 2016 IEEE International Parallel and Distributed Processing Symposium (IPDPS), May 23-27, 2016, Chicago, IL, USA, IEEE, 10 pages.

Kvatinsky, S. et al., "MAGIC-Memristor-Aided Logic," IEEE Transactions on Circuits and Systems—II: Express Briefs, vol. 61, No. 11, Nov. 2014, IEEE, pp. 895-899, 5 pages.

Kvatinsky, S. et al., "Vteam: A General Model for Voltage-Controlled Memristors," IEEE Transactions on Circuits and Systems II: Express Briefs, vol. 62, Issue 8, Aug. 2015, first published May 2015, IEEE, 5 pages.

Lecun, Y. et al., "Gradient-based learning applied to document recognition," Proceedings of the IEEE, vol. 86, No. 11, Nov. 1998, IEEE, 46 pages.

Li, H. et al., "Hyperdimensional computing with 3D Vrram in-memory kernels: Device-architecture co-design for energy-efficient, error-resilient language recognition," 2016 IEEE International Electron Devices Meeting (IEDM), Dec. 3-7, 2016, San Francisco, CA, USA, IEEE, 4 pages.

Liu, S. et al., "Energy efficient stochastic computing with Sobol sequences," Design, Automation & Test in Europe Conference & Exhibition (Date), Mar. 27-31, 2017, Lausanne, Switzerland, IEEE, 4 pages.

Mitrokhin, A. et al., "Learning sensorimotor control with neuromorphic sensors: Toward hyperdimensional active perception," Science Robotics, vol. 4, No. 30, May 2019, 11 pages.

Nazemi, M. et al., "SynergicLearning: Neural Network-Based Feature Extraction for Highly-Accurate Hyperdimensional Learning," arXiv:2007.15222v2 [cs.LG], Aug. 4, 2020, 9 pages.

Paszke, A. et al., "PyTorch: An Imperative Style, High-Performance Deep Learning Library," NIPS'19: Proceedings of the 33rd International Conference on Neural Information Processing Systems, Article No. 721, Dec. 2019 , 12 pages.

Rahimi, A. et al., "A Robust and Energy-Efficient Classifier Using Brain-Inspired Hyperdimensional Computing," ISLPED '16: Proceedings of the 2016 International Symposium on Low Power Electronics and Design, Aug. 2016, 6 pages.

Reiss, A. et al., "Introducing a New Benchmarked Dataset for Activity Monitoring," 2012 16th International Symposium on Wearable Computers, Jun. 18-22, 2012, Newcastle, UK, IEEE, 2 pages.

Shafiee, A. et al., "ISAAC: A Convolutional Neural Network Accelerator with In-Situ Analog Arithmetic in Crossbars," 2016 ACM/IEEE 43rd Annual International Symposium on Computer Architecture (ISCA), Jun. 18-22, 2016, Seoul, South Korea, IEEE.

Synopsys, "A New World of Innovation," https://www.synopsys.com, available as early as 2021, 9 pages.

Wu, T.F. et al., "Brain-inspired computing exploiting carbon nanotube FETs and resistive RAM: Hyperdimensional computing case study," 2018 IEEE International Solid—State Circuits Conference—(ISSCC), Feb. 11-15, 2018, San Francisco, CA, USA, IEEE, 3 pages.

Imani, M. et al., "A Binary Learning Framework for Hyperdimensional Computing," 2019 Design, Automation & Test in Europe Conference & Exhibition (Date), Mar. 25-29, 2019, Florence, Italy, IEEE, 6 pages.

Imani, M. et al., "BRIC: Locality-based Encoding for Energy-Efficient Brain-Inspired Hyperdimensional Computing," 2019 56th ACM/IEEE Design Automation Conference (DAC), Jun. 2-6, 2019, Las Vegas, NV, USA, IEEE, 6 pages.

(56)                    References Cited

OTHER PUBLICATIONS

Imani, M. et al., "Exploring Hyperdimensional Associative Memory," 2017 IEEE International Symposium on High Performance Computer Architecture (HPCA), Feb. 4-8, 2017, Austin, TX, IEEE, 12 pages.

Imani, M. et al., "Hierarchical Hyperdimensional Computing for Energy Efficient Classification," 2018 55th ACM/ESDA/IEEE Design Automation Conference (DAC), Jun. 24-28, 2018, San Francisco, CA, USA, IEEE, 6 pages.

Kim, Y. et al., "Efficient Human Activity Recognition Using Hyperdimensional Computing," IOT '18: Proceedings of the 8th International Conference on the Internet of Things, Article No. 38, Oct. 2018, 6 pages.

Final Office Action for U.S. Appl. No. 17/744,371, mailed Jan. 3, 2024, 15 pages.

Non-Final Office Action for U.S. Appl. No. 17/895,177, mailed Nov. 15, 2023, 9 pages.

Bandaragoda, T. et al., "Trajectory clustering of road traffic in urban environments using incremental machine learning in combination with hyperdimensional computing," 2019 IEEE Intelligent Transportation Systems Conference (ITSC), Oct. 27-30, 2019, Auckland, NZ, 7 pages.

Benjaminson, Emma, "Basics of VAEs," ML Bonanza Episode 1, GitHub, May 6, 2020, 7 pages.

Imani, M. et al., "SemiHD: Semi-Supervised Learning Using Hyperdimensional Computing," 2019 IEEE/ACM International Conference on Computer-Aided Design (ICCAD), Westminster, CO, 2019, 8 pages.

Jordan, Jeremy, "Variational autoencoders," Data Science, Jeremy. Jordan.Me, Mar. 19, 2018, 17 pages.

Menon, A. et al., "Efficient emotion recognition using hyperdimensional computing with combinatorial channel encoding and cellular automata," Brain Informatics, vol. 9, No. 14, 2022, 13 pages.

Mistry, Shivang, "Variational Autoencoders—Explained," Analytics Vidhya, Medium, Jan. 3, 2020, 14 pages.

Montagna, F. et al., "PULP-HD: Accelerating Brain-Inspired High-Dimensional Computing on a Parallel Ultra-Low Power Platform," 55th Annual Design Automation Conference (DAC), Jun. 2018, San Francisco, CA, 6 pages.

Schlegel, K. et al., "Multivariate Time Series Analysis for Driving Style Classification using Neural Networks and Hyperdimensional Computing," 2021 IEEE Intelligent Vehicles Symposium (IV), Jul. 11-17, 2021, Nagoya, Japan, IEEE, 8 pages.

Wang, R. et al., "Brief Industry Paper: HDAD: Hyperdimensional Computing-based Anomaly Detection for Automotive Sensor Attacks," 2021 IEEE 27th Real-Time and Embedded Technology and Applications Symposium (RTAS), Nashville, TN, 2021, pp. 461-464.

* cited by examiner

ARTIFICIAL INTELLIGENCE FRAMEWORK COMBINING A SPIKING NEURAL NETWORK AND A HYPERDIMENSIONAL COMPUTING BLOCK

RELATED APPLICATIONS

This application claims the benefit of provisional patent application Ser. No. 63/237,645, filed Aug. 27, 2021, the disclosure of which is hereby incorporated herein by reference in its entirety.

GOVERNMENT SUPPORT

This invention was made with government funds under grant number N000142112225 awarded by the Department of the Navy, Office of Naval Research. The U.S. Government has rights in this invention.

FIELD OF THE DISCLOSURE

The present disclosure relates to artificial neural networks and in particular to spiking neural networks and hyperdimensional computing.

BACKGROUND

Recently, brain-inspired computing models have shown great potential to outperform today's deep learning solutions in terms of robustness and energy efficiency. Particularly, spiking neural networks (SNNs) and hyperdimensional computing (HDC) have shown promising results in enabling efficient and robust cognitive learning. Despite their success, these two brain-inspired models have different strengths. While SNNs mimic the physical properties of the human brain, HDC models the brain on a more abstract and functional level. Thus, a need remains for a new brain-inspired artificial intelligence framework that captures the strengths of both SNNs and HDC models.

SUMMARY

An artificial intelligence framework is disclosed having a spiking neural network configured to extract low-level features from event-based spiking data and to provide the low-level features as a spiking neural network output signal. Further included is a hyperdimensional computing block that is configured to map the spiking neural network output signal into high-dimensional space and classify data from the abstract information.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 6A is a diagram showing that test accuracy is measured by the classification accuracy of the MNIST test data from the model given SNN size, dimension of the HDC memory, and proportion of faulty parameters.

FIG. 6B is a diagram showing that fault tolerance is measured by the quality of prediction sustained under memory failure, using its 0-fault counterpart and a random classifier, which has a test accuracy of 0.1 in the case of MNIST, as a reference.

DETAILED DESCRIPTION

Figure 1:
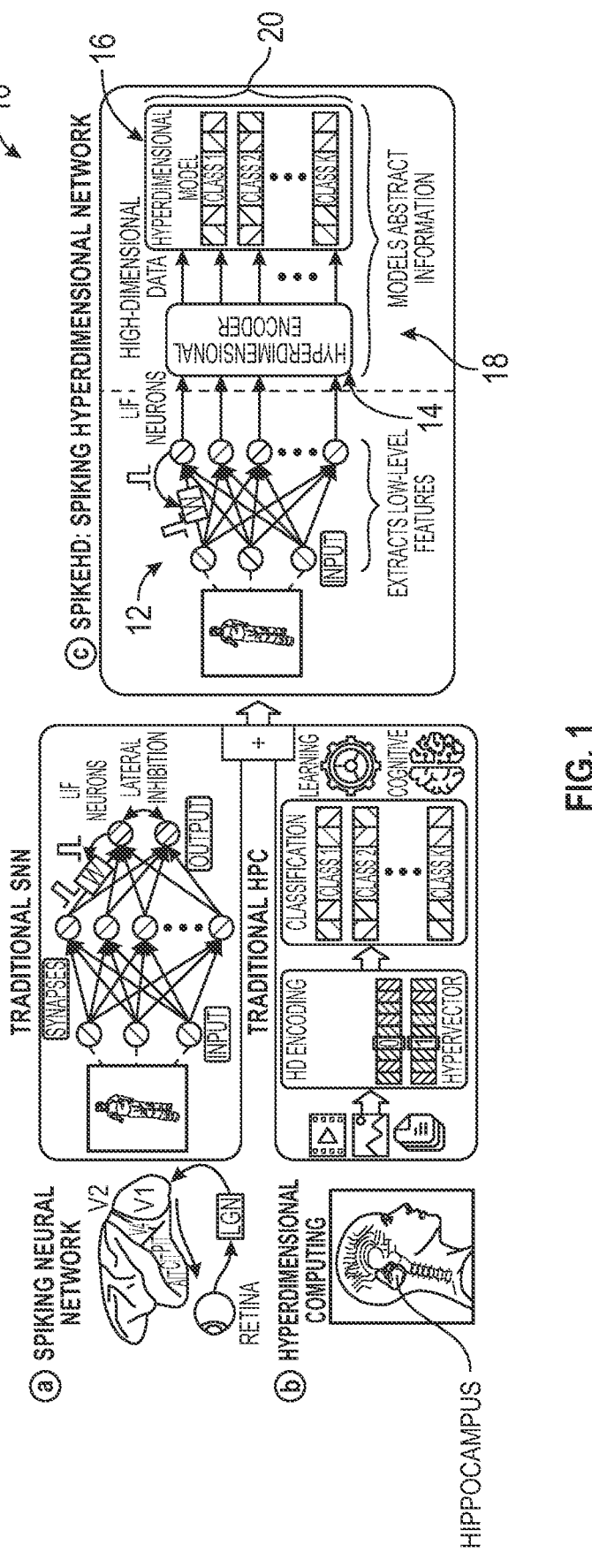
FIG. 1 is a diagram showing the SpikeHD overview architecture that is a spiking hyperdimensional neural network framework, according to the present disclosure: Part (a) demonstrates that the leaky-integrate-and-fire (LIF) layers of the spiking neural network (SNN) have a high synaptic resemblance to the neuronal systems in the brain that gives rise to its advantage in the learning of sensory data processing and maintaining working memory for classification; part (b) demonstrates that the high-dimensionality and holography of hyperdimensional computing (HDC) renders a cerebellum-like functionality with a high-capacity memory; and part (c) demonstrates that the combination of SNN and HDC as guided by the Atkinson-Shiffrin memory model allows the SpikeHD framework to take advantage of both and overcome their respective shortcomings.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

As depicted in FIG. 1, the present disclosure relates to an artificial intelligence (AI) framework that combines a spiking neural network (SNN) shown in FIG. 1, part (a), with hyperdimensional computing (HDC) illustrated in FIG. 1, part (b). The disclosed AI framework is referred to herein as a SpikeHD framework 10 and is depicted in FIG. 1, part (c). The SpikeHD framework 10 includes an SNN 12 that is configured to drive an HDC encoder 14, which in turn drives an HDC learning model 16. The HDC encoder 14 and the HDC learning model 16 are implemented in an electronic hardware block referred to herein as an HDC block 18, which includes but is not limited to logic gates and HDC memory 20. The structure of the SpikeHD framework 10 is configured as a scalable and strong cognitive learning system that better mimics brain functionality using brain-inspired computing models.

Brain-Inspired Computing Models

Despite the complexity of the state-of-the-art machine learning models and the unparalleled computing power that can be applied, the human brain remains the most sophisticated processing component that has ever existed. The ever-growing research in biological vision, cognitive psychology, and neuroscience has given rise to many concepts that have led to prolific advancement in AI accomplishing cognitive tasks.

Analogy from the Brain

The SNN 12 embodies sensory processing patterns of the brain from a biological standpoint, while Vector Symbolic Architecture (VSA) processes data from the behavioral patterns. Different embodiments or the SpikeHD framework 10 were evaluated using deep continuous local learning (DECOLLE; as SNN representative) and HDC (as VSA representative).

(1) Memory model: One accepted memory model includes sensory registers, short-term store, and long-term store. In particular, short-term store (STS) is made of the memory in storage for a short amount of time (referred to as short-term memory) that can be actively engaged in processing (working memory). Long-term store (LTS) refers to the memory maintained for long periods of time. Structures centered around the hippocampus serve to process and transfer memory between short-term and long-term storage.

(2) SNN (DECOLLE) as STS: Spiking neural networks mimic biological neural networks at the neuronal level, where the representation of the information is the collective state of the spiking neurons, including membrane potential and synaptic states. Given neuromorphic data that are either transformed from frame-based counterparts or are captured directly by dynamic vision sensors (DVSs), the SNN 12 has the structural advantage in accomplishing simple cognitive tasks. In particular, the recurrent nature of DECOLLE renders DECOLLE ideal for serving both as a sensory processing unit and as an STS.

(3) VSA (HDC) as LTS: Hyperdimensional computing mimics the brain on a functional and behavioral level. Just as the hippocampus represents long-term memory for the sake of efficient storage and retrieval, the HDC learning model 16 represents information in ultra-wide words—that is, with very high-dimensional vectors known as hypervectors. These hypervectors can be efficiently and robustly stored in HDC learning model 16 realized in electronic hardware such as field-programmable gate arrays and graphics processing units compared with both non-VSA and most VSA representations. Both field-programmable gate arrays and graphics processing units include memory for storing the hypervectors. Given informative pieces of data, which in this case is sensory data after being processed by the SNN 12, the HDC learning model 16 can efficiently extract higher-level concepts through the process of encoding, which is what the hippocampus does, and memorization, which is what the long-term storage does.

Hyperdimensional Computing

The brain's circuits are massive in terms of numbers of neurons and synapses, suggesting that large circuits are fundamental to the brain's computing. The hypervectors used in the HDC learning model 16 are constructed from raw signals using an encoding procedure. There exists a huge number of different, nearly orthogonal hypervectors with the dimensionality in the thousands. This allows combination of such hypervectors into a new hypervector using well-defined vector space operations while keeping the information of the two nearly orthogonal hypervectors with high probability. Hypervectors are holographic and pseudorandom with independent identically distributed components. A hypervector contains all the information combined and spread across all the independent identically distributed components in a full holistic representation so that no element is more responsible for storing any piece of information than another.

In recent years, HDC has been employed in a range of applications, such as text classification, activity recognition, biomedical signal processing, multimodal sensor fusion, and distributed sensors. A key advantage of HDC is that HDC training may be completed in one or at most two or three training sessions, where object categories are learned from one or a few examples provided in a single pass over the training data instead of many iterations. Hyperdimensional computing has achieved comparably higher accuracy than support vector machines (SVMs), gradient boosting, and convolutional neural networks (CNNs), as well as lower execution energy on embedded processors compared with SVMs, CNNs, and long short-term memory.

Spiking Neural Network

Spiking neural networks are brain-inspired solutions for fault-tolerant and energy-efficient signal processing. SSNs take inspiration from the biological functionality of neurons in the human brain. As such, SSNs are employed in engineering more efficient computing architectures. In the area of machine learning, SNNs share common properties with recurrent neural networks (RNNs), such as similarity in general architecture, temporal dynamics, and learning through weight adjustments. Several works are now establishing formal equivalences between RNNs and networks of spiking leaky integrate-and-fire (LIF) neurons, which are widely used in computational neuroscience. In the LIF model, the state of the neuron is the momentary activation level that can be pushed higher or lower depending on the incoming spike value. The neuron state is reset to a lower value after firing the state.

Spiking neural networks have multiple existing update rules, such as spike time dependent plasticity (STDP) and gradient descent. STDP depends on pre-synaptic and post-synaptic information. Several existing hardware solutions have focused on implementation of STDP in the forms of unsupervised and semi-supervised learning. However, these works are limited in learning static patterns or shallow networks. Recent breakthrough research shows that local DECOLLE provides effective and efficient training with approximate loss that maintains synaptic plasticity. However, even with a gradient, the ability to train deep SNNs having several hidden layers has remained a major obstacle. The inclination for deep SNNs to diverge during training limits its expected potential.

SpikeHD Overview

The present disclosure discloses a hybrid solution that fundamentally combines SSNs and HDC. This disclosed hybrid solution is realized by the SpikeHD framework 10 of the present disclosure.

The SpikeHD framework 10 according to the present disclosure employs SNN and HDC in the following ways:

Spiking Neural Network: The SNN 12 extracts low-level information of neuromorphic data. The SNN 12 is like a feature extractor that learns spatiotemporal information of noisy spikes and projects them into meaningful representation. The SNN 12 eliminates noisy events that are less frequent in a temporal manner and utilizes redundancy to further strengthen spatially correlated information. DECOLLE uses the network errors computed within each layer, thus requiring little to no memory overhead for computing gradients.

Hyperdimensional Encoding: HDC performs a higher-level learning over spike data generated by the SNN 12. HDC has an encoder layer and a learner layer. The encoder layer maps SNN output spikes into high-dimensional space. The HDC encoder 14 is unsupervised and substantially efficient since the HDC encoder 14 does not require a training process. Since the HDC encoder 14 is nonlinear, a single-layer HDC classifier can effectively learn the data. The training only operates over the HDC model of the HDC learning model 16 to keep efficiency and does not propagate to the HDC encoder 14.

Combining SNN and HDC

A naive approach can use SNN and HDC either in a parallel version or in a series version to make a prediction. In the parallel version, both SNN and HDC can make independent predictions, and decisions can be made by looking at the decisions along with their confidence. However, this approach has the following challenges: (1) high computational cost to train two separated models, and (2) decision making and trust in the model is a complex task and requires another learning model. Similarly, the serial connection of SNN and HDC has the following challenges: (1) an information flow that is limited between the models impedes the ability of both: the latter fails to make good predictions due to a lack of information, and the former fails to be updated due to a lack of loss inferred from the prediction; and (2) SNN and HDC are working over different data representations and update rules. SNN works with spike data and is trained using gradient-based rule, while HDC works using dense high-dimensional data representation. This makes HDC and SNN learning not compatible and their interactions non-trivial.

To get simultaneous benefits from SNN and HDC, the SpikeHD framework 10 needs to combine SNN and HDC based on their strengths and capabilities. The SpikeHD framework 10 uses two layers of information extraction from event-based sensors: (1) SNN layer to extract low-level information by preserving spatiotemporal correlation of data and (2) HDC to learn the abstract and high-level trend of data. The SpikeHD framework 10 co-trains the SNN 12 and the HDC learning model 16. The co-training enables the interaction between SNN 12 and the HDC learning model 16 to ensure convergence towards an optimal model. As FIG. 1 shows, hyperdimensional learning operates over the spike data and has two components: a non-linear neural encoder that maps SNN output to high-dimensional space and an HDC learning model 16 that combines encoded hypervectors to generate a hypervector representing each class within a set of associated classes. In exemplary embodiments, the HDC learning model 16 makes a final prediction.

The following presents additional details pertaining to the SpikeHD framework 10 that integrates the SNN 12 and the HDC learning model 16, according to the present disclosure. For example, the SpikeHD framework 10 employs the SNN 12 to extract low-level features by preserving the spatial and temporal correlation of raw event-based spiking data. Then, HDC learning model 16 is utilized to operate over an SSN output signal of the SNN 12 by mapping the SNN output signal into high-dimensional space, learning the abstract information, and classifying the data. Extensive evaluation on a set of benchmark classification problems shows that the SpikeHD framework 10 provides the following benefit compared with traditional SNN architecture: (1) the SpikeHD framework 10 enhances learning capability by exploiting two-stage information processing, and (2) the SpikeHD framework 10 enables substantial robustness to noise and failure, and (3) reduces the network size and required parameters to learn complex information.

Many applications run machine learning algorithms to assimilate the data collected in the swarm of devices on the Internet of Things (IoT). Sending all the data to the cloud for processing is not scalable and cannot guarantee a real-time response. However, the high computational complexity and memory requirement of existing deep neural networks hinders usability to a wide variety of real-life embedded applications where the device resources and power budget are limited. Therefore, an alternative learning method is needed to train on the less-powerful IoT devices while ensuring robustness and generalization.

System efficiency comes from sensing and data processing. Unlike classical vision systems, neuromorphic systems try efficiently to capture a notion of seeing motion. Bio-inspired learning methods, that is, the SNN 12, address issues related to energy efficiency. Spiking neural networks such as the SNN 12 have been widely used in many areas of learning and signal processing. These systems have yet to provide robustness and intelligence that matches that from embodied human cognition. For example, the existing bio-inspired method cannot integrate sensory perceptions with the actions. Spiking neural network applications in machine learning have largely been limited to very shallow neural network architectures for simple problems. Using deep SNN architecture often does not improve learning accuracy and can result in a possible training divergence. In addition, the SNN 12 lacks brain-like robustness and cognitive support.

On the other hand, the HDC learning model 16 is a promising brain-inspired solution for robust and efficient learning. The HDC learning model 16 is motivated by the understanding that the human brain operates on high-dimensional representations of data originated from the large size of the brain circuits. The HDC learning model 16 thereby models the human memory using points of a high-dimensional space, that is, with hypervectors. The HDC learning model 16 performs a learning task after mapping data into high-dimensional space. This encoding is performed using a set of pre-generated base vectors. The HDC learning model 16 is well suited to address several learning tasks in IoT systems; for example, (i) the HDC learning model 16 is computationally efficient and amenable to hardware level optimization, (ii) the HDC learning model 16 supports single-pass training with no back-propagation or gradient computation, (iii) the HDC learning model 16 offers an intuitive and human-interpretable model, (iv) the HDC learning model 16 is a computational paradigm that can be applied to a wide range of learning and cognitive problems, and (v) the HDC learning model 16 provides strong robustness to noise, which is a key strength for IoT systems. Despite the foregoing listed advantages, HDC encoding schemes are not designed for handling neuromorphic data. Therefore, the HDC learning model 16 does not typically include the behavioral resemblance to neurons to extract features from neuromorphic data effectively.

While the SNN 12 mimics the physical properties of the brain, such as how biological neurons operate, the HDC learning model 16 models the brain at a more abstract and functional level. The SNN 12 and the HDC learning model 16 are complementary. Inspired by the classical and popular memory model introduced by Atkinson—Shiffrin, the present disclosure discloses the SpikeHD framework 10 that combines the desirable features of the SNN 12 with the desirable features of the HDC learning model 16. As a result, the SpikeHD framework 10 enables a scalable and strong cognitive learning system to better mimic brain functionality. The SpikeHD framework 10 creates a cross-layer, brain-inspired system that captures information of sensory data from different perspectives: low-level neural activity and pattern-based neural representation. Since both the SNN 12 and the HDC learning model 16 have memorization capability and thereby are relatively robust in preserving spatial and temporal information. As such, the SpikeHD framework 10 can ensure advanced learning capability with high accuracy.

The SpikeHD framework 10 uses a few layers of the SNN 12 to extract low-level spatiotemporal information of raw event-based data. In exemplary embodiments, the few layers of the SNN 12 are only a single digit number of layers. The SpikeHD framework 10 utilizes the HDC learning model 16 to operate over an SNN to learn the abstract information and classify event-based data. To ensure robust, efficient, and accurate HDC learning, the HDC encoder 14 is a non-linear neural encoder that is configured to transform data into knowledge at a very low cost and with comparable accuracy to state-of-the-art methods for diverse applications.

In this regard, the SpikeHD framework 10 is considered an end-to-end framework that enables co-training of SNN 12 and the HDC learning model 16. Instead of using a deep SNN architecture, the SNN 12 updates based on a gradient descent rule and connects the SNN 12 to the HDC learning model 16, which is capable of fast and single pass learning. The SpikeHD framework 10 according to the present disclosure trains the SNN 12 and various types of HDC models for the HDC learning model 16 simultaneously to ensure that the data generated by the SNN 12 are maximally efficient for HDC learning.

In exemplary embodiments, the SpikeHD framework 10 is configured to support online learning from an Internet data stream and/or an intranet data stream. In this configuration, the SNN layer is kept static while exploiting HDC single-pass training capability to update the HDC model in real-time. This enables the SpikeHD framework 10 to learn or update the SpikeHD framework 10 functionality with very few samples relative to traditional SNNs and without having the cost of storing large-scale training data for iterative learning.

Figure 2:
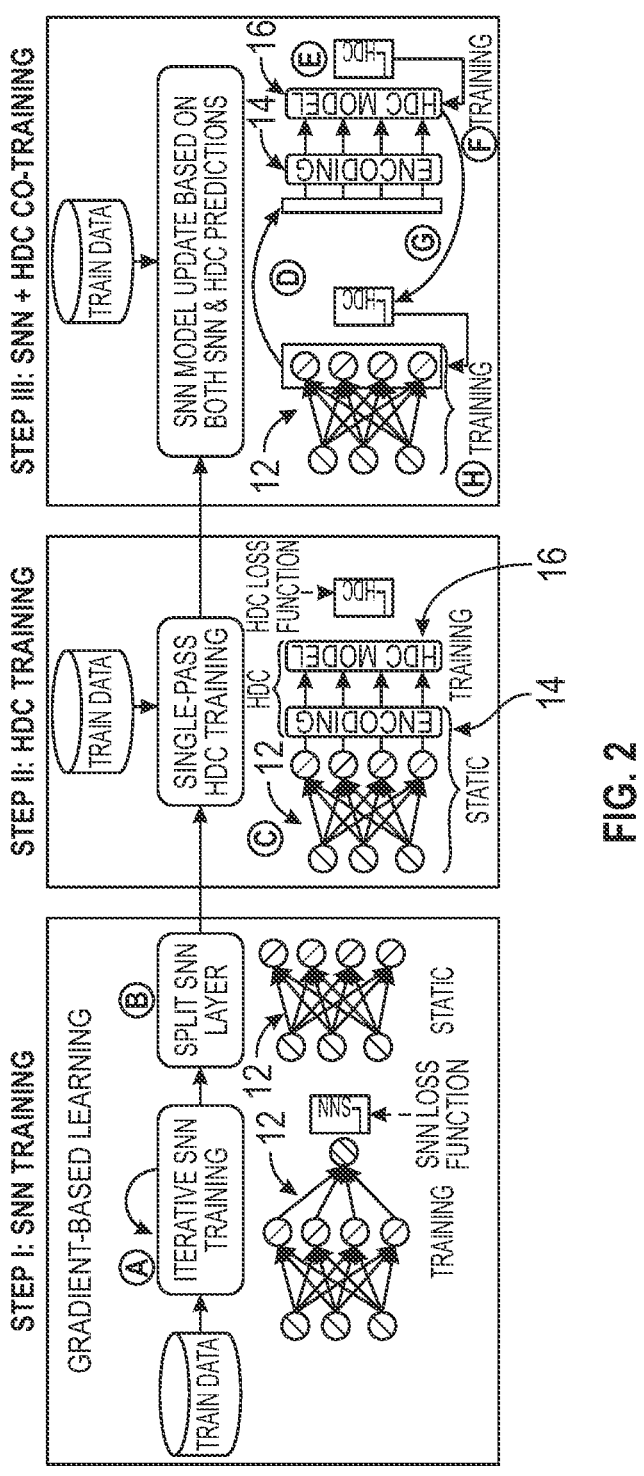
FIG. 2 is a diagram showing an exemplary SpikeHD training process utilized by the SpikeHD framework.

The SpikeHD framework 10 has been evaluated on multiple classification problems. The evaluations show that the SpikeHD framework 10 provides significant advantages over traditional HDC and SNN architectures. A first advantage is enhanced learning capability that exploits two-stage information processing. A second advantage over traditional HDC and SNN architectures is a significant reduction of network size and required parameters to learn complex information. For example, the results indicate that the SpikeHD framework 10 provides at least 6.1% and 3.8% higher classification accuracy on Modified National Institute of Standards and Technology database (MNIST) and Dynamic Vision Sensor (DVS) Gesture datasets, respectively. In this regard, FIG. 2 shows an overview of operational details of the SpikeHD framework 10. In an exemplary embodiment, Step I is SNN iterative training, in which an original instance of SNN is trained without the influence of HDC and in which initial feature extraction recurrent learning from neuromorphic data is established; Step II is HDC single-pass training, in which the HDC module is first injected into a deep SNN layer, and training data are propagated from the SNN input layer forward through the HDC module to make a prediction, which leads to modification in the HDC memory 20; and Step III is SNN and HDC co-training, in which the loss from the output of HDC module is used to update both HDC memory and SNN layers simultaneously.

Step I: SNN Training

SNN training establishes feature extraction and fine-tunes the short-term memory behavior of an SNN model of the SpikeHD framework 10. The SNN training of an original SNN model is implemented with deep continuous local learning (DECOLLE) using a batch of training data. In this case, the SNN 12 is a multi-layer network that gets spike data as an input and makes a learning decision on the output layer. Depending on a loss function defined on SNN output, the SNN 12 uses a gradient-based rule to update the synapse's weights (A). During this phase of the training, the SNN 12 learns to extract information from noisy neuromorphic data. Because the synaptic plasticity rules are partially derived from the neural dynamics of the spiking neurons, the SNN 12 is capable of learning spatiotemporal patterns. Increasingly complex features can be learned by adding layers to the SNN 12, but adding layers is costly and introduces difficulty in convergence. Thus, the number of layers is often limited.

Step II: HDC Training

After training the SNN 12 to approximate convergence, the present solution applies HDC injection. For example, the SNN 12 is split from early layers (often a relatively deep SNN layer) and is connected to the HDC learning model 16 to extract more abstract information (B). In this step, the SNN layers are static because no training happens on the SNN 12. For each training datum, data are first passed through the SNN 12. Then, the SNN representation is given in the split layer as labeled data to the HDC learning model 16 for training. The HDC encoder 14 serves as the "hippocampus" and maps the spike data into high-dimensional space. Due to the non-linearity of the encoder, the HDC learning model 16 can efficiently learn the pattern of data (C). One advantage of HDC learning model 16 is that the HDC learning model 16 is configured to learn a one-pass classification model. This eliminates the necessity of a costly iterative method to training a model. As the learning heavily depends on memorization of the encoded hypervectors, the HDC learning model 16 serves as the long-term memory of the SpikeHD framework 10.

Step III: SNN and HDC Co-training

A traditional approach would typically train the SNN 12 and the HDC learning model 16 sequentially, where the training of the SNN 12 does not get any feedback from the HDC learning model module 10. In the traditional approach, the SNN 12 is trained based on the loss function defined at the SNN output layer. However, the presently disclosed hybrid architecture performs the prediction using the HDC learning model 16. This results in sub-optimal training of the SpikeHD framework 10.

To address this issue, a co-training method is disclosed that enables the SNN 12 to be trained based on the prediction made by the HDC learning model 16. To ensure the SNN layers of the SNN 12 are well trained by the prediction made by the HDC learning model 16, the SpikeHD framework 10 retrains the SNN layers after training of the HDC learning model 16. For every training datum or batch of data, the SpikeHD framework 10 begins updating the SNN 12 as follows: First, the spike data passes through the split SNN layer (D) up until the point of injection and generates vectors as input to the HDC learning model 16. Next, the HDC encoder 14 encodes the input, which is then compared with the hypervectors stored by the HDC learning model 16; the loss function is computed against a target label (E). After that, the loss is used to update the HDC model of the HDC learning model 16 in a single-pass. The learning in HDC learning model 16 is pattern-based and can be performed with substantially higher computation efficiency (F). Then, HDC back-propagates the loss through the HDC encoder 14 back to the point of injection (G). Finally, the SNN 12 updates using gradient-based rules with the back-propagated loss (H). This procedure continues iteratively over training data until finding a suitable SNN representation that can ensure maximum prediction accuracy in the HDC output.

One thing to note is that the back-propagation in (F) mainly concerns two matrix multiplications with no significant overhead during training. Passing through the HDC learning model 16 requires multiplying the loss with the HDC learning model 16 itself and passing through the HDC encoder 14 requires the inverse of the activation function and the Moore-Penrose inverse of the encoding matrix, the latter of which can be pre-computed upon the initialization of the model.

Since the HDC learning model 16 has faster training than SNN 12, the HDC learning model 16 can be updated less frequently during the co-training step. During co-training, the HDC loss function can be back-propagated and used to update the SNN layer while the HDC learning model 16 stays constant. Thus, the HDC model update can happen less frequently to ensure lower training costs.

Loss Back-Propagation

During Step III execution of the SpikeHD framework 10, a Moore-Penrose inverse of the HDC encoding performed by the HDC encoder 14 is applied to back-propagate the loss from the HDC learning model 16 to the SNN 12. Since the HDC encoder 14 maps vectors to hypervectors, the rank of the inverse is limited to the output dimension of the SNN 12 at the point of injection, which may be much less than the dimension. A large amount of information may be lost from this transition. Several methods were tested to solve this problem. One example is to continue training the original SNN, transfer the new weights to the SpikeHD framework 10, and then train the HDC learning model 16. This did not improve performance except in the case of the transfer learning task, where the context of the data or the task changes. One method that may be suggested is to introduce a regularization term in the loss function of the SNN layers such that it outputs an HDC-like vector as the representation of the data directly. This avoids the explicit usage of the HDC non-linear encoder, and the loss is optimally propagated up to the approximation introduced by the regularization term.

SpikeHD Online Learning

Training hybrid SNN and HDC model can be costly for small, embedded devices because the framework requires iteratively repeated co-training phases, which often requires a large amount of data and a large number of iterations to update the quality of the SNN model. Embedded devices may have the following limitations to implement SpikeHD iterative learning: (1) embedded devices often do not have enough memory to keep all training data for iterative training; and as a result, to enable online learning, the SpikeHD framework needs to be updated in one-pass with no need to store training data; and (2) embedded devices have limited resources, which may not be enough to support the costly gradient-based model update required by SNN. A solution is disclosed that enables online SpikeHD learning. Hyperdimensional computing supports single-pass training by creating a model with one-time looking at training data. This feature is used to update the SpikeHD framework in real-time based on the data stream. In this configuration, the SNN model is assumed to be static and does not get updated. Instead, for each batch of data, the SpikeHD framework only updates the HDC model based on the generated loss function. This is similar to transfer learning, where the SNN knowledge is used for new data or environments. This model results in much faster convergence and eliminates the necessity of storing training data.

Scalability and Robustness of the SpikeHD Framework

SpikeHD hybrid architecture provides an advanced brain-inspired learning solution with multi-layer information processing. This architecture is substantially strong in preserving spatiotemporal information. The SpikeHD framework 10 also provides the following advantages:

Scalability: Using deep SNN architecture often does not improve learning accuracy or results in a possible divergence. The hybrid architecture of the SpikeHD framework enables SNNs to use effective shallow networks rather than deep non-scalable networks. Hyperdimensional computing encoding is used as secondary information processing to provide a high quality of learning while ensuring fast and scalable SNN training.

Robustness: Hyperdimensional computing encoding is holographic and redundant and thus provides significant robustness to noise and failure. The architecture according to the present disclosure stores information of events as a pattern of neural activity in high-dimensional space. Therefore, losing a single or series of dimensions does not remove the information of an event.

Evaluation

The classification performance of SpikeHD was evaluated based on two benchmarks: DVS Gesture Dataset and spike-trained MNIST. DVS Gesture Dataset is obtained by Dynamic Vision Sensor (DVS) capturing 11 types of hand and arm gestures from 29 distinct subjects under 3 different lighting conditions. The DVS Gesture Dataset is thus natively neuromorphic. Spike-trained MNIST, in contrast, is artificial and comes from processing the original frame-based MNIST images to spike trains, where the serialized pixel values determine the firing rate of the simulated sensors.

The disclosed SpikeHD framework 10 has been implemented with two co-designed modules: spiking neural network and hyperdimensional computing. For SNN, an existing open-source library is used that trains a network using the gradient-based rule. For HDC, an in-house library has been developed that is compatible with PyTorch. That library is an optimized version of PyTorch that better handles the HDC memory requirement for computer processing units and graphics processing units. The default parameters of the SpikeHD framework 10 are as follows. The SNN 12 has 5 LIF layers with, respectively, 150, 120, 100, 120, and 150 neurons. Each LIF layer is associated with a readout layer and a dropout layer as made necessary by local learning. For the HDC learning model module 10, a dimension of D=4000 is used, and the HDC encoder 14 utilizes the hyperbolic tangent function (Tanh) as the activation function. The injection depth that indicates the layer of the SNN 12 where the HDC learning model 16 is injected is by default 4, which means that it is injected right before the last LIF layer. Finally, the default dataset for evaluation is spike-trained MNIST.

Quality of Learning

Figure 3:
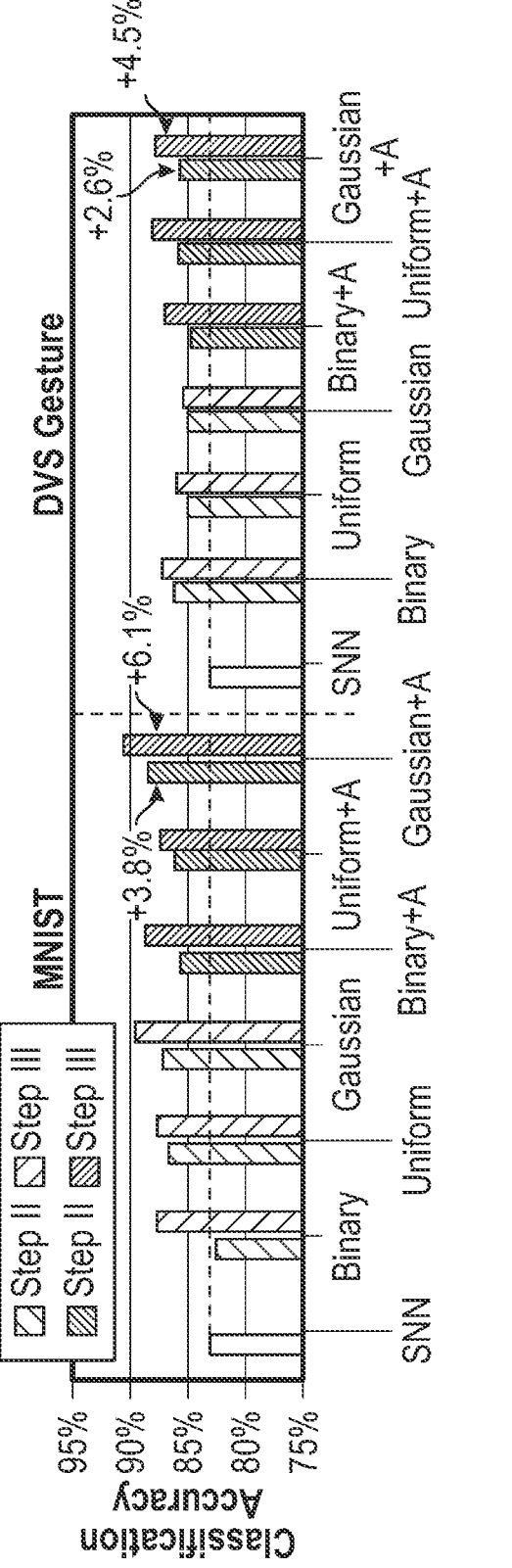
FIG. 3 is a bar graph showing training performance of SpikeHD framework with distinct HDC encoders on the Modified National Institute of Standards and Technology database (MNIST) and (Dynamic Vision Sensor) DVSGesture.

FIG. 3 compares the test classification accuracy of the SpikeHD framework 10 with state-of-the-art SNN. For the SNN 12, the conventional DECOLLE architecture is used in the default configuration. For HDC, HDC models were adopted to directly encode and learn from neuromorphic data with the default dimension and the HDC encoder 14. For different instances of the SpikeHD framework 10, the default parameters were applied except for a variable—the HDC encoder 14. The models were trained iteratively for 40 epochs, all of which reached convergence.

The evaluation shows that the default SpikeHD framework 10 outperforms both traditional SNN and traditional HDC in terms of quality of learning. The HDC model alone provides the lowest classification accuracy, as the HDC encoder is weak in extracting spatial and temporal information from noisy spike data. In other words, HDC learning is abstract and cannot be well adapted to extract low-level information from neuromorphic data. In contrast, SNN naturally models the brain's visual systems, thus providing high classification accuracy. However, the SNN accuracy saturates with the increase in the number of layers. In contrast, the SpikeHD framework 10 is a powerful classifier that extracts multi-layer information from the neuromorphic data. Therefore, it eliminates the necessity of using deep SNN layers. The evaluation shows that SpikeHD achieves, on average, 5.7% and 3.2% higher classification accuracy compared with the SNN model after co-training on MNIST and DVS Gesture, respectively.

Hyperdimensional Encoding

To show the impact of the HDC encoder 14 according to the present disclosure, FIG. 3 also compares accuracy of the SpikeHD framework 10 when HDC is using different types of encoder modules: linear (Binary), random projection (Uniform), and the disclosed non-linear encoder (Gaussian). The evaluation shows that the SpikeHD framework 10 using a non-linear encoder provides significantly higher classification accuracy compared with the other encoders, independent of the base hypervectors. In particular, linear encoding (labeled as "Binary" in FIG. 3) provides the lowest accuracy among them due to limited HDC memory capacity—4000 bits per class—compared with the ones with non-binary base vectors. The higher accuracy of encoding by the disclosed method comes from (1) the substantially superior performance of the SpikeHD framework 10 in considering the interactions between the features, and (2) exploiting an activation function that makes the mapping non-linear. The evaluation shows that the SpikeHD framework 10 utilizing non-linear encoder achieves, on average, 3.1% and 2.4%, respectively, which is higher quality of learning compared with the linear and random projection encoders. In reference to FIG. 3, each bar plot represents the accuracy of SNN along with SpikeHD using HDC encoders with binary, uniform, or Gaussian-based hypervectors. For HDC encoder, the results are reported with and without an activation function (+A indicates an encoder with Tanh activation.)

Evaluation also showed that there is progressive improvement in the learning accuracy as the model proceeds with training steps. In most cases, the test accuracy has significant improvement from Step I to Step II, and slightly less from Step III.

SpikeHD Training Phases

Figure 4:
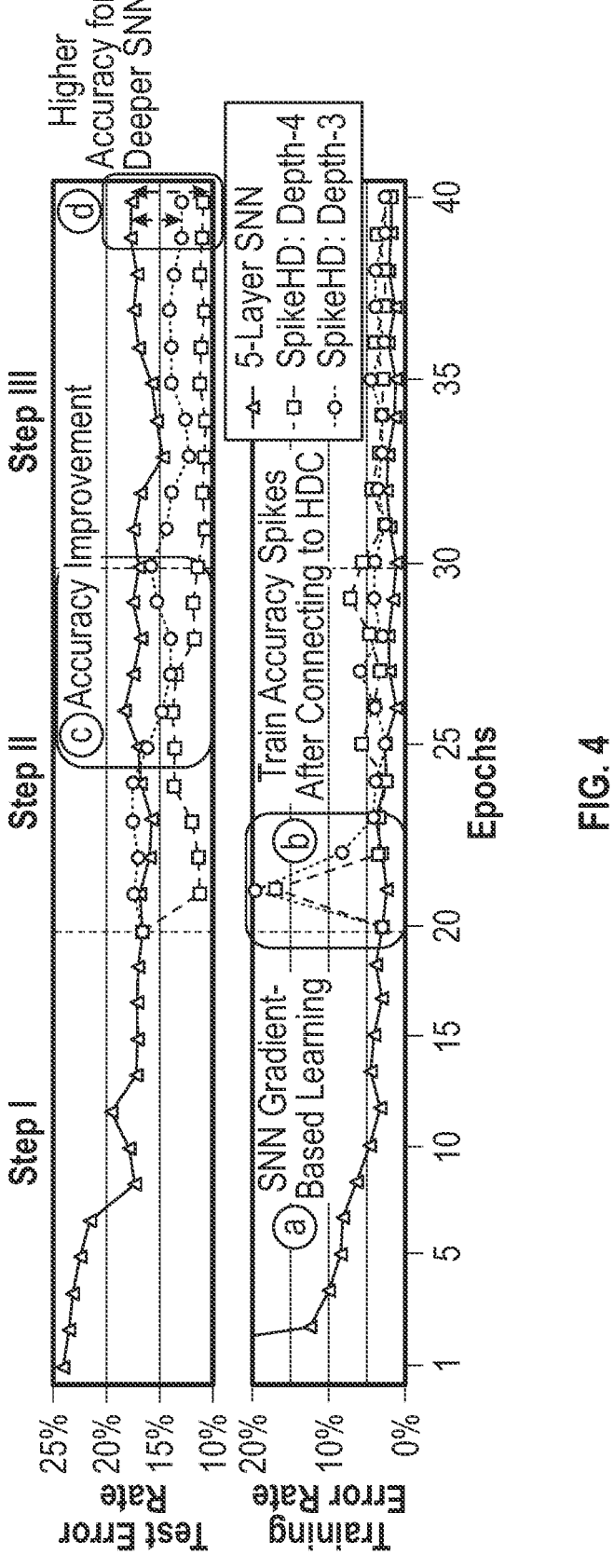
FIG. 4 is a plot showing the average training and testing accuracy of SpikeHD models with a five-layer-deep continuous local learning (DECOLLE) and HDC injection at various depths, compared with pure DECOLLE trained for the same number of epochs.

FIG. 4 shows the effect of depth of HDC injection on SpikeHD classification accuracy during both training and testing phases. The results are reported for the SpikeHD framework 10 in comparison with DECOLLE with a default setting.

During Step I of the training (FIG. 4, (a)), the accuracy of both the training and testing data quickly increases and stabilizes. This implies the efficiency and effectiveness of DECOLLE in simulating and processing spike data, despite its limited generalization as indicated by the non-trivial difference between test accuracy and train accuracy.

When the model enters Step II, the training accuracy experiences a sharp drop at epoch 20 because of the switch from the latter LIF layer to the HDC learning model 16 (FIG. 4, (b)). The cause is that since the HDC memory 20 is initially a random model; it has no predictive power. That said, the training/testing is then reduced and stabilized in about one epoch. In addition, test accuracy experienced an improvement (FIG. 4, (c)) for the displayed depths of injection, which indicates that the HDC modules further extracted and memorized features from the DECOLLE layers that are useful to the prediction. The result of the trivial model with HDC-injection at depth-5 was omitted because it achieves similar performance as the baseline (pure SNN) because the depth-5 HDC module connects to the last layer of SNN, which essentially takes the prediction produced by SNN and does learning based on that.

Finally, the model enters Step III at epoch 30. Notice that the training accuracy does not have any improvement while the test accuracy has its final improvement (FIG. 4, (d)) most accentuated for the depth-3 model. This indicates that the improvement in test prediction comes from the update to the SNN layer in conjunction with that to the HDC memory 20.

As results indicate, the original SNN network suffers from overfitting, as demonstrated by the difference in training and testing accuracy due to the depth of the network. In comparison, SpikeHD mitigates this issue by introducing more explicit memory based on non-linear encoding and is less sensitive to the number of layers. Starting from depth-4, SpikeHD observes significant improvement on the prediction, and the best performance is at depth-4 with the parameters that were chosen; this is partly due to DECOLLE's capacity to extract more meaningful features in the deeper layers, and the long-term memory that the HDC model provides gives rise to increased testing accuracy and, if not eliminated, mitigated the overfitting of DECOLLE model (FIG. 4, (d)).

SpikeHD Online Learning

Figure 5:
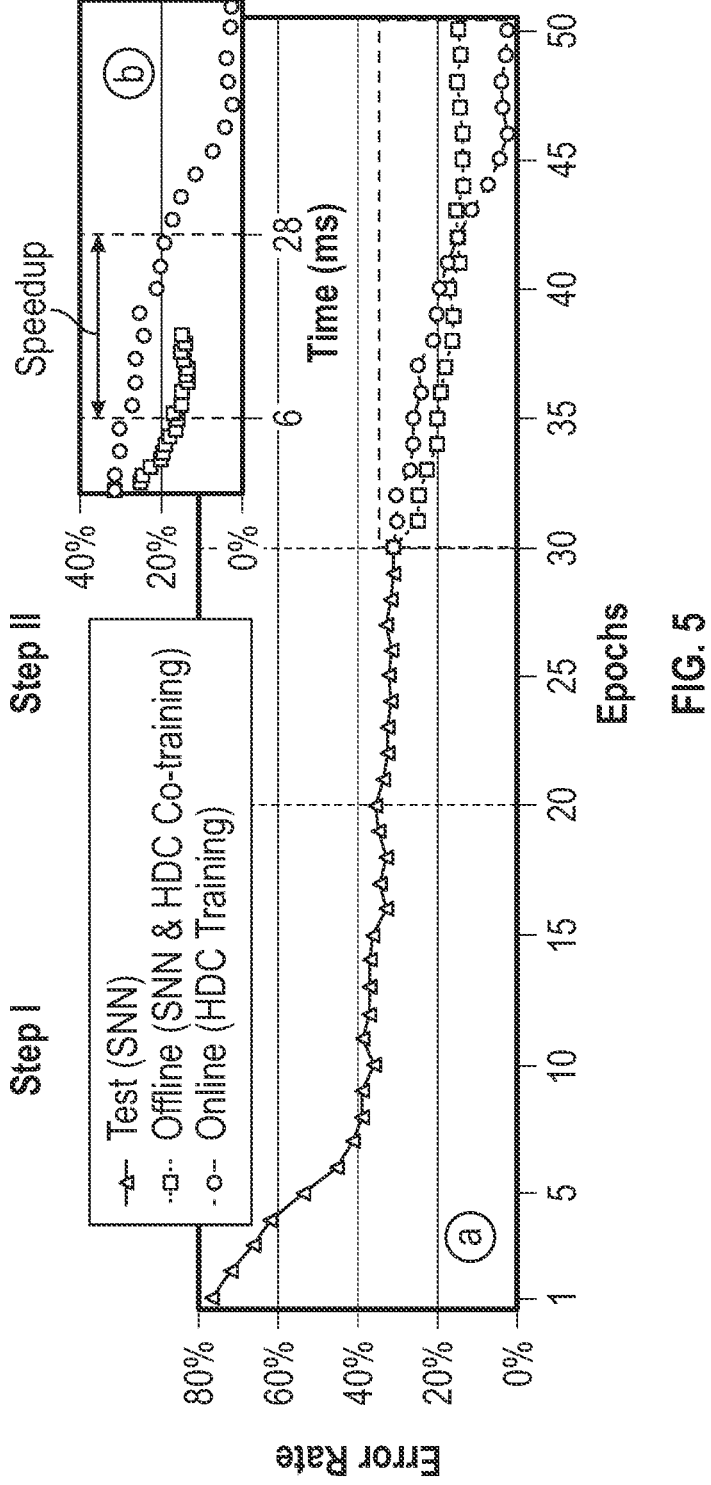
FIG. 5 is a plot showing online and offline training performance by epoch and by running time.

FIG. 5 compares SpikeHD training efficiency during SpikeHD offline and online training. For fairness, both methods perform Step I and Step II SpikeHD training over a small portion of training data. For the rest of the training data, SpikeHD-offline continues updating the model by co-training the SNN 12 and HDC learning model 16 (Step III defined in the disclosed framework), while SpikeHD-online only updates the HDC learning model 16. In other words, SpikeHD-online keeps SNN layers fixed and transfers the learned knowledge for the rest of training data. In reference to FIG. 5, (a) demonstrates the training progress of Steps I and II with limited training data (100 samples for MNIST); and then training with the rest of the data either online, where only the HDC part is updated, or offline, where the co-training happens; and (b) demonstrates the training progress measured by running time, with Step II and online/offline step, the former of which is scaled according to training data size for reference.

Notice first that even with only 100 MNIST samples, 10 for each class, DECOLLE was able to extract many meaningful features. This is indicated by the immediate increase in test accuracy in Step I (see FIG. 5). In Step II, the epoch-wise and time-wise convergence results are reported for both offline and online methods. The time-wise graph is shown as one epoch with different times in offline and online techniques. The results indicate that the online method reaches convergence more quickly than the offline method, though the offline method may perform better upon convergence. Observe that the training time of the offline method is much longer than that of the online learning method. This is partly due to DECOLLE's local training. From the convergence speed and the accuracy improvement, note also that (1) online training incorporates new samples quickly into HDC memory 20, and (2) the co-training succeeds in back-propagating the loss to the SNN 12 so that it is updated for better performance.

Evaluation shows that the SpikeHD-online learning method can provide comparable accuracy to that of the SpikeHD-offline learning method even when the initial training is very limited (100 samples). In other words, SpikeHD can ignore costly iterative training for a big portion of train data. Instead, it simply updates the HDC model at a minimal cost. Evaluation shows that SpikeHD-online method can significantly speed up the training process and reduces the memory footprint required for training. For example, SpikeHD online enables 4.6× faster and 3.1× lower trainable memory while ensuring the same quality as an online model.

SpikeHD Accuracy and Robustness vs. HDC Dimensionality

Figure 6A:
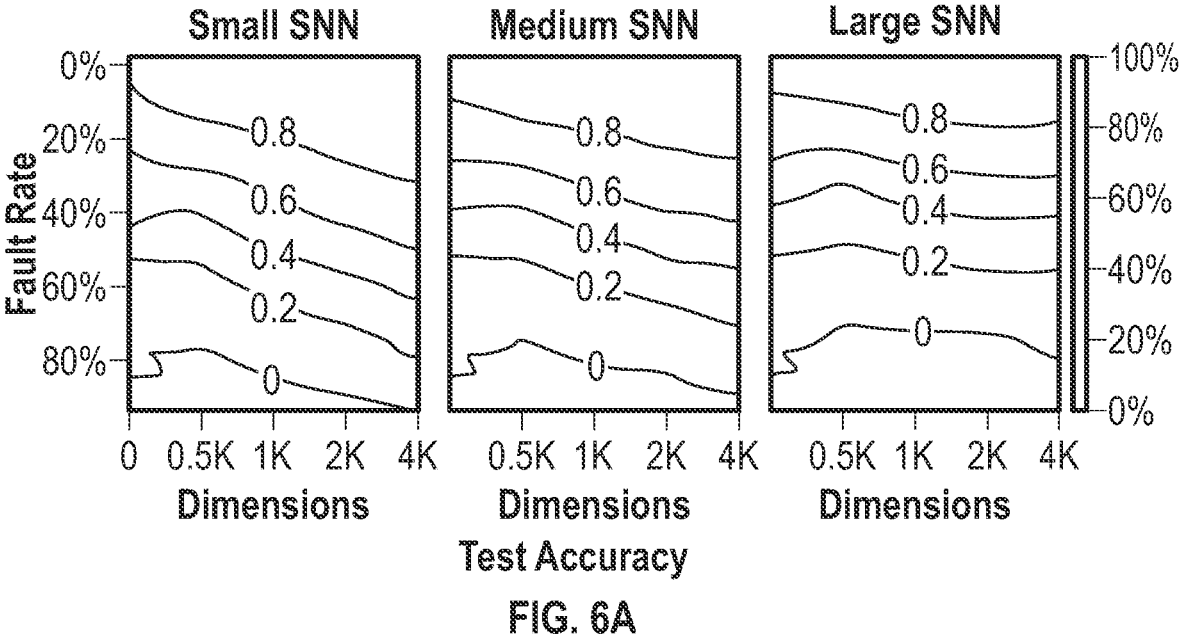
FIGS. 6A and 6B are diagrams showing the test accuracy and fault tolerance of SpikeHD under different SNN and HDC parameter settings.
Figure 6B:
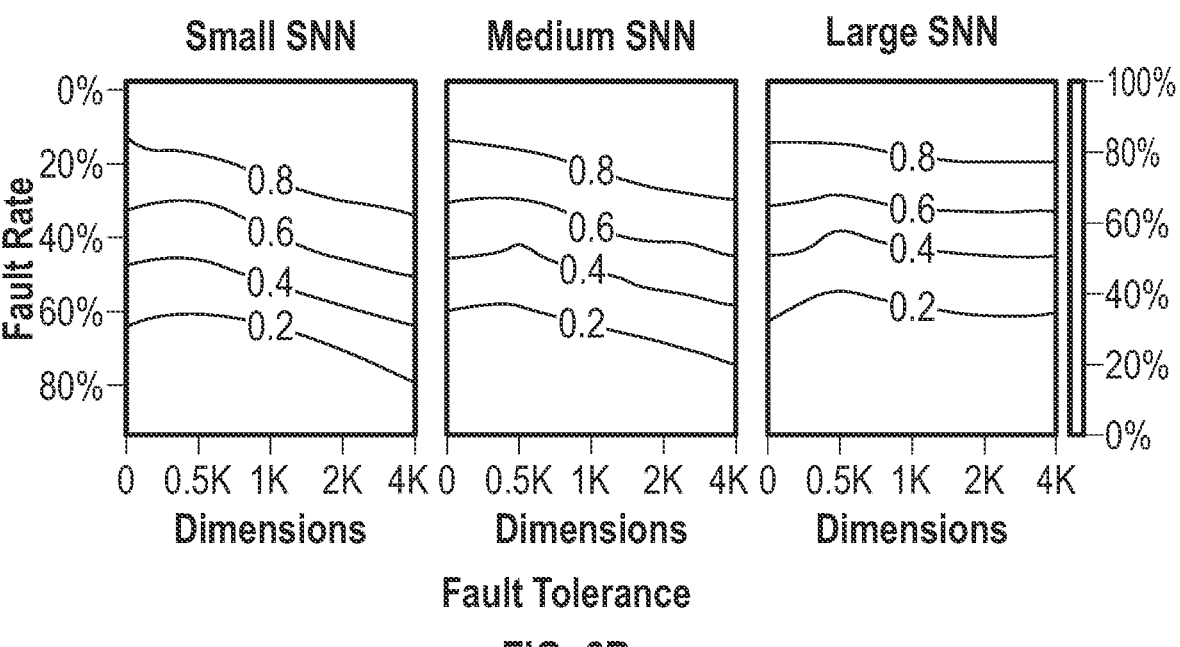

Dimensionality creates a trade-off between three SpikeHD parameters: accuracy, efficiency, and robustness. FIGS. 6A and 6B show the impact of hypervector dimension on SpikeHD test accuracy (considering 0% error rate). The SpikeHD framework 10 in higher dimensionality is a powerful model that can effectively learn the SNN output patterns. The SpikeHD framework 10 provides maximum accuracy even when the dimension reduces from D=8k to D=4k. Further decreasing the dimensionality from D=4k results in a minor effect on SpikeHD quality of learning. For example, the SpikeHD framework 10 in D=2k and D=1k provides only 2.3% and 3.5% quality loss, respectively, compared with the SpikeHD framework 10 in full dimensionality (D=8k). The efficiency of the SpikeHD framework 10 also directly depends on the model dimensionality. A higher dimensionality increases the number of required computations in both training and testing. However, because the accuracy of HDC modules resembles a sigmoid function along the dimension, to reduce the computation cost, one can decide to use the SpikeHD framework 10 in lower dimensionality. For example, reducing the SpikeHD framework 10 dimension from D=4k to D=2k (D=1k) results in 1.7× (3.1×) faster computation.

Figure 7:
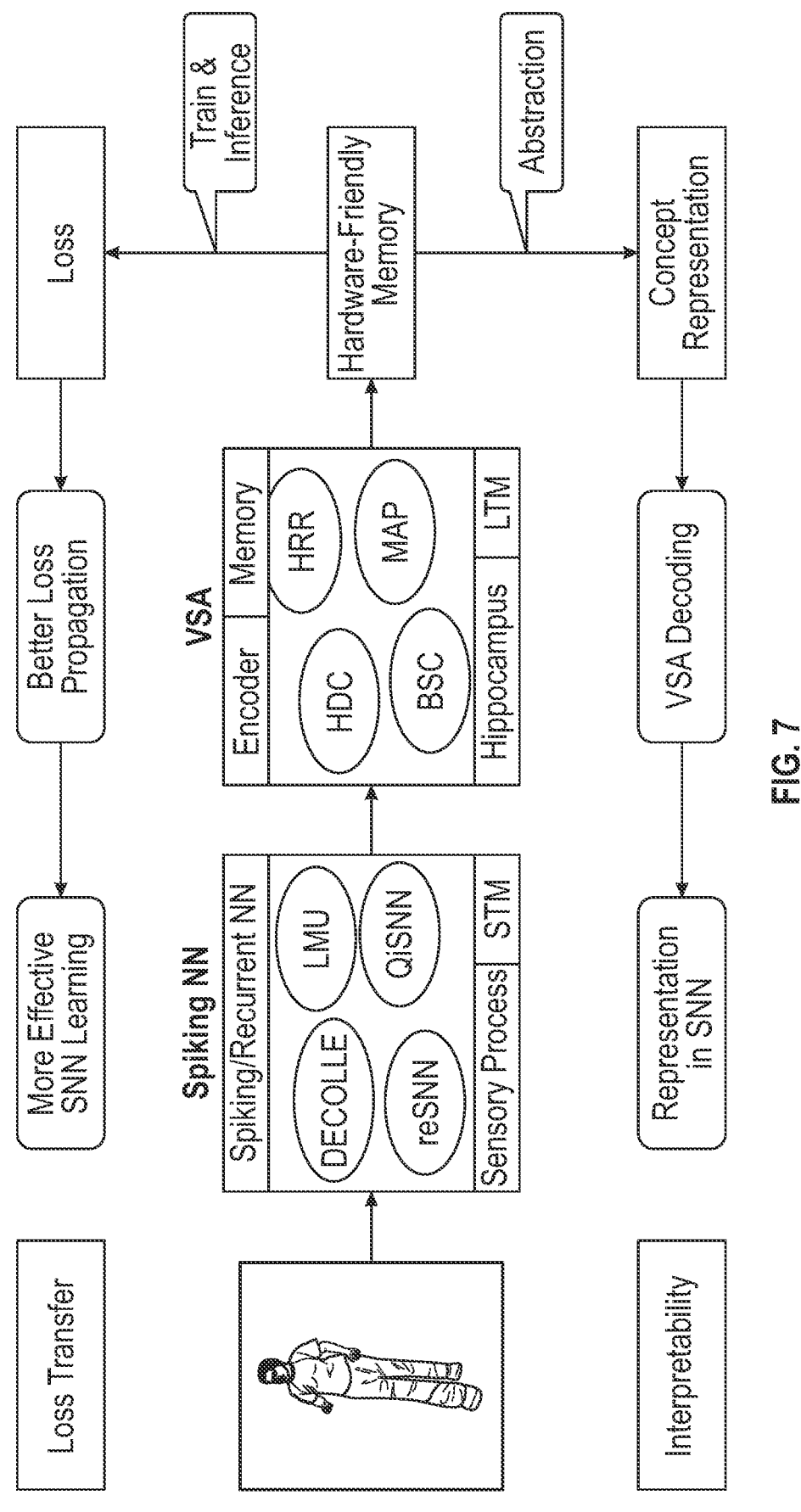
FIG. 7 is a diagram showing an overview of the SpikeHD framework that incorporates SNNs and vector symbolic architecture at a high level.

Computational robustness of the SpikeHD framework 10 was compared with traditional SNN. Evaluation shows that the HDC learning model 16 employed by the SpikeHD framework 10 substantially improves SNN robustness to possible noise and failure. FIGS. 6A and 6B show SpikeHD accuracy when losing a different proportion of random neurons in the model. The results are reported for the SpikeHD framework 10 using different dimensionality and using different size SNN networks. Evaluation shows that the SpikeHD framework 10, in general, provides higher robustness than the traditional SNN, especially when dimensionality if the SpikeHD framework 10 increases. For example, under 10% random noise, the SpikeHD framework 10 and the traditional SNN maintain 94.0% and 87.1% quality, respectively. The ability to sustain prediction quality generally increases as the dimension of HDC memory 20 increases, though it does generate a slight dip when the HDC dimension is low. This can be attributed to the fault tolerance of DECOLLE and the higher vulnerability of low-dimensional HDC modules. The results indicate that test accuracy has only a slight advantage when the HDC dimension is high, and SNN is large. This advantage is more accentuated in smaller SNNs, or in more complex tasks. Moreover, the SpikeHD framework 10 substantially reduces the network size and required parameters to learn complex information. See FIG. 7.

Hyperdimensional Classification

Figure 8A:
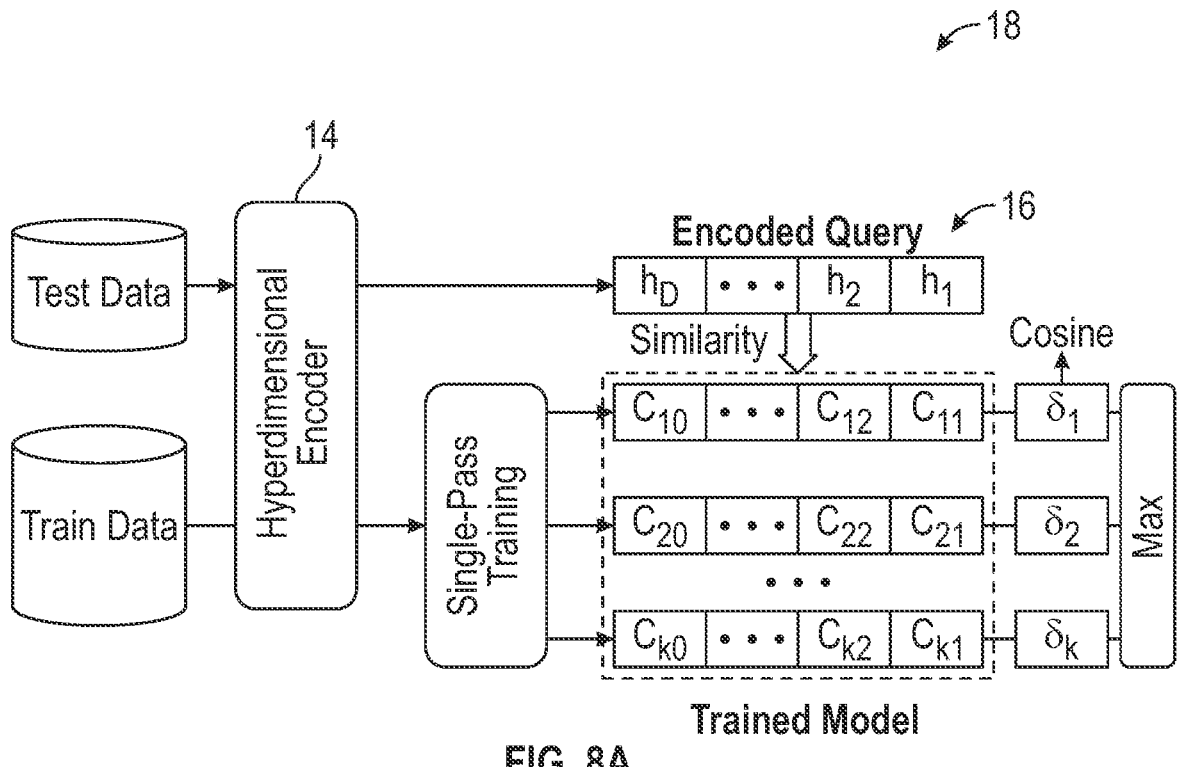
FIGS. 8A and 8B are diagrams showing an overview of hyperdimensional classification during both training and testing phases, and a HDC non-linear encoder, respectively.

Also disclosed is an embodiment of a robust and lightweight hyperdimensional classification. FIG. 8A shows an overview of HDC learning. The first step in HDC block 18 is to encode data into high-dimensional space. Then, HDC block 18 performs a learning task over encoder data by performing a single-pass training. The result of training generates a hypervector representing each class. The inference task can be performed by checking the similarity of an encoded query to the class hypervector.

Non-Linear Encoding

An encoder is a component of hyperdimensional learning. A goal of the encoder is to map data into high-dimensional space such that from the data, knowledge can be extracted at a lower computational cost. Selection of an encoder type depends on the data type, such as data structure and the target learning task. Various HDC-based encoding methods exist. Although these methods have shown excellent classification accuracy for their application-specific problems, the existing encoding methods linearly combine the hypervectors corresponding to each feature, resulting in sub-optimal classification quality for general classification problems. To obtain more informative hypervectors than is possible with traditional encoders, the HDC encoder 14 of the present disclosure utilizes the nonlinear interactions between the feature values with different weights.

In this context, the HDC encoder 14 is configured with an encoding method that employs a kernel trick to map data points into the high-dimensional space. The underlying idea of the kernel trick is that data, which is not linearly separable in original dimensions, might be linearly separable in higher dimensions. Consider certain functions K(x, y) which are equivalent to the dot product in a different space, such that $$K(x, y) = \phi(x) \cdot \phi(y),$$

where $\phi(\cdot)$ is often a function for high-dimensional projection. The radial basis function or Gaussian kernel is the most popular kernel:

$$K(x, y) = e^{\frac{-\|z - y\|^2}{2\sigma^2}}.$$

Advantage of this implicit mapping is taken by replacing a decision function with a weighted sum of kernels:

$$f(\cdot) = \sum_{i=0}^{N} c_i K(\cdot, x_i),$$

where $(x_i, y_i)$ is the training data sample, and the $c_i$'s are constant weights. The the inner product can efficiently approximate a radial basis function (RBF) kernel, such that $$K(x, y) = \phi(x) \cdot \phi(y) \approx z(x) \cdot z(y).$$

The Gaussian kernel function can now be approximated by the dot product of two vectors, z(x) and z(y).

Figure 8B:
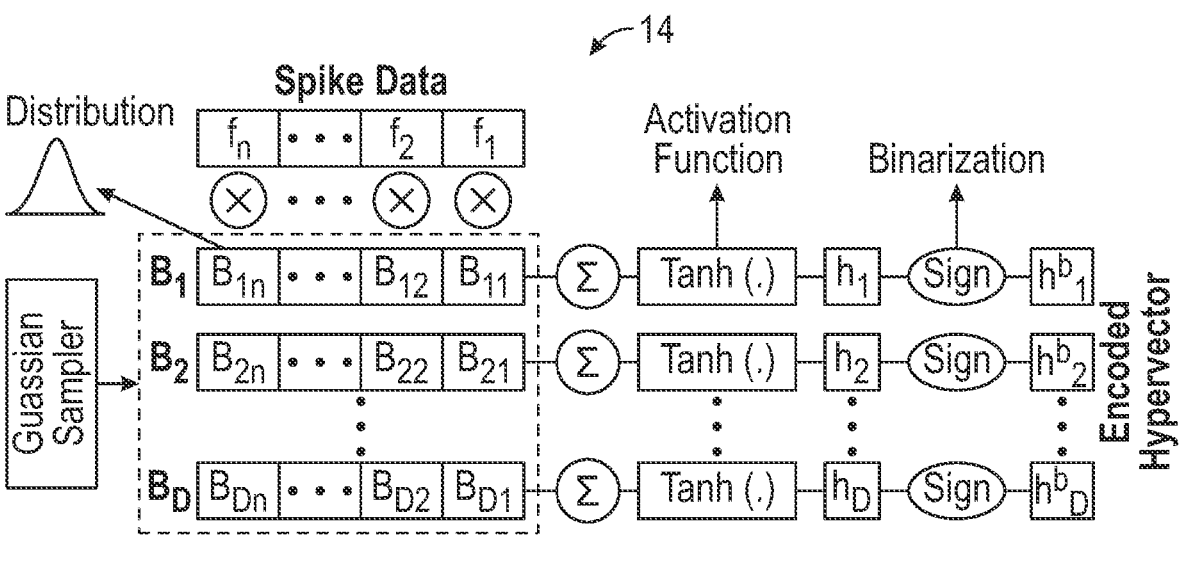

FIG. 8B shows an encoding procedure according to the present disclosure. Assume an input vector in original space $$\vec{F} = \{f_1, f_2, \cdots, f_n\}$$

and $F \in R^n$. The HDC encoder 14 maps this vector into a high-dimensional vector, $$H = \{h_1, h_2, \cdots, h_D\} \in R^D,$$

where D≫n. The following equation shows an encoding method that maps an input vector into high-dimensional space:

$$h_i = \cos\left(\vec{F} \cdot \vec{B}_i + b_i\right) \sin\left(\vec{F} \cdot \vec{B}_i\right), \qquad (1)$$

where $\vec{B}_k$'s are randomly chosen, hence orthogonal, base hypervectors of dimension D≅10k to retain the spatial or temporal location of features in an input and $b_i \sim U(0,2\pi)$. That is, $$\vec{B}_{kj} \sim \mathcal{N}(0, 1) \text{ and } \delta\left(\vec{B}_{k_1}, \vec{B}_{k_2}\right) \approx 0,$$

where δ denotes the cosine similarity. However, this activation is not a convex function, thus making it impossible to back-propagate from the HDC encoder 14. Although HDC learning does not rely on back-propagation, the integration of SNNs and HDC requires back-propagation through the HDC encoder 14. To address this issue, the hyperbolic tangent function (Tanh) is employed as an activation function:

$$h_i = \tanh\left(\vec{F} \cdot \vec{B}_i + b_i\right). \qquad (2)$$

After this step, each element $h_i$ of a hypervector $H^n$ has a non-binary value. In the HDC, binary (bipolar) hypervectors are often used for computation efficiency. Thus, the final encoded hypervector is obtained by binarizing it with a sign function ($H=\text{sign}(H^n)$), where the sign function assigns all positive hypervector dimensions to 1 and zero/negative dimensions to $-1$. The encoded hypervector stores the information of each original data point with D bits. In an example, the feature vector, F, is highly sparse event-based data. However, after mapping data through the foregoing encoder, the generated high-dimensional data becomes a dense binary representation.

Hyperdimensional Model Training

Embodiments of the present disclosure utilizes hyperdimensional learning to directly operate over encoded data. FIG. 8A shows an overview of HDC classification. Hyperdimensional computing identifies common patterns during learning and eliminates saturation of the class hypervectors during single-pass training. Instead of combining all encoded data, the approach according to the present disclosure adds each encoded training datum to class hypervectors depending on how much new information an identified pattern adds to class hypervectors. If a data point already exists in a class hypervector, the HDC learning model 14 either adds no data or adds a relatively tiny portion of data to the model to eliminate hypervector saturation. If the prediction matches the expected output, no update is made to avoid overfitting. This adaptive update provides a higher chance and weight to non-common patterns to represent the final model This method can eliminate the necessity of using costly iterative training.

Assume $\vec{\mathcal{H}}$ as a new training data point. Hyperdimensional computing computes the cosine similarity of $\vec{\mathcal{H}}$ with all class hypervectors. The similarity of a data point is computed with $\vec{C}_i$ as $\delta(\vec{\mathcal{H}}, \vec{C}_i)$. Instead of adding a data point to the model, the HDC of the present embodiments updates the model based on the $\delta$ similarity. If an input data has label l and correctly matches with the class, the model updates as follows:

$$\vec{C}_l \leftarrow \vec{C}_l + \eta_1(1 - \delta_1) \times \vec{\mathcal{H}}, \qquad (3)$$

where $\eta$ is a learning rate. A large $\delta_l$ indicates that the input is a common data point which already exists in the model. Therefore, the update adds a very small portion of encoded query to the model to eliminate model saturation ($1-\delta_1 \cong 0$). If the input data get an incorrect label of l', the model updates as follows:

$$\vec{C}_l \leftarrow \vec{C}_{l'} + \eta_2(\delta_{l'} - \delta_1) \times \vec{\mathcal{H}}, \qquad (60)$$

where $\delta_{l'} - \delta_l$ determines the weight to which the model needs to be updated. Small $\delta_{l'} - \delta_l$ indicates that the query is marginally mismatched, while larger mismatch is updated with a larger factor ($\delta_{l'}\delta_l \gg$).

Hyperdimensional Inference

In inference, HDC checks the similarity of each encoded test datum with the class hypervector in two steps. A first step encodes the input using the same encoding used for training to produce a query hypervector $\vec{\mathcal{H}}$. The second step computes the similarity ($\delta$) of $\vec{\mathcal{H}}$ and all class hypervectors. Query data get the label of the class with the highest similarity.

SpikeHD Trainable Parameters

Figure 9:
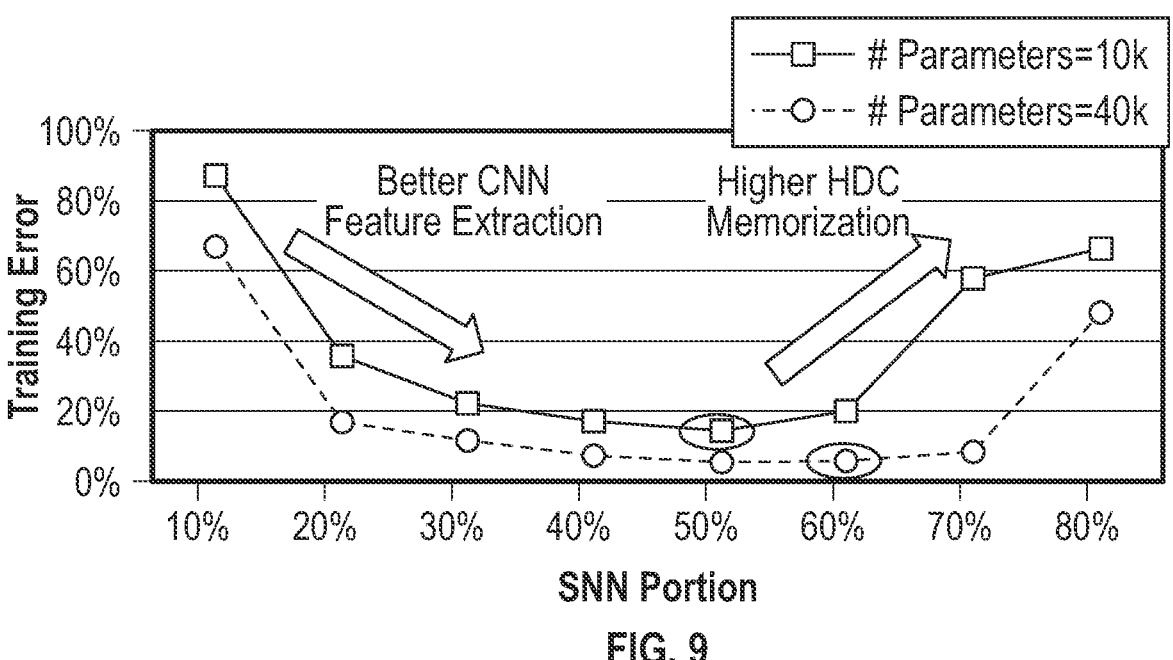
FIG. 9 is a plot showing SpikeHD performance with different SNN/HDC training parameter ratios, wherein the lines describe the average training accuracy of SpikeHD varying on the number of trainable parameters that are assigned to SNN.

FIG. 9 demonstrates the effect of a trainable parameter ratio on the performance of the model. To stress-test the model, the shape of the SNN is limited to three LIF layers with a size ratio 2:3:2, and the dimension of the HDC is derived from however many trainable parameters are allowed in HDC memory 20, up to residue. For small SpikeHD (solid line with 10k parameters), there is a fine spot where optimal accuracy is reached. This is because the training data requires that the SNN 12 be large enough to extract meaningful features, which explains the left slope, and the HDC memory 20 should be large enough to memorize these features, which explains the right slope. Because the accuracy of the HDC memory 20 resembles a sigmoid function with respect to dimension in practice, and the accuracy deteriorates rapidly upon lowering the dimension to a certain threshold. This is demonstrated in the rapid increase in error rate for the SpikeHD framework 10 with a very high SNN proportion. In addition, due to the correlation of the dimension threshold to the output dimension of the SNN 12 instead of the size of the SNN 12, large SpikeHD (dashed line with 40k parameters) requires a smaller proportion of the HDC memory 20 to perform well. The demand for the size of HDC memory 20 also comes from the number of classes. For example, the Omniglot dataset, a few-shot, 1623-class classification task, demands high HDC memory.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. An artificial intelligence framework comprising:
   a spiking neural network (SNN) implemented in electronic hardware configured to extract low-level features from event-based spiking data and provide the low-level features as a spiking neural network output signal; and
   a hyperdimensional computing (HDC) block implemented in an electronic hardware block comprised of logic gates and an HDC memory, wherein the HDC block comprises:
   an HDC encoder configured to map the spiking neural network output signal into high-dimensional space and classify data from the abstract information; and
   an HDC learning model that is configured to combine encoded hypervectors and generate a hypervector for each class within a set of associated classes.

2. The artificial intelligence framework of claim 1 wherein the HDC encoder is a non-linear neural encoder.

3. The artificial intelligence framework of claim 1 wherein the HDC learning model is configured to store the encoded hypervectors within the HDC memory.

4. The artificial intelligence framework of claim 1 wherein the SNN is configured to be trained based on a prediction made by the HDC learning model.

5. The artificial intelligence framework of claim 1 wherein the HDC block is configured to perform a Moore-Penrose inverse of HDC encoding performed by the HDC encoder.

6. The artificial intelligence framework of claim 5 wherein the HDC block is configured to apply the Moore-Penrose inverse of HDC encoding to back-propagate loss from the HDC learning model to the SNN.

7. The artificial intelligence framework of claim 1 wherein the HDC encoder is configured to use a hyperbolic tangent function as an activation function.

8. The artificial intelligence framework of claim 1 wherein the HDC encoder is configured with an encoding method that employs a kernel trick to map data points into the high-dimensional space.

9. The artificial intelligence framework of claim 8 wherein the kernel trick is applied to a Gaussian kernel.

10. The artificial intelligence framework of claim 1 wherein the SNN is configured to pass a training datum to the HDC encoder.

11. The artificial intelligence framework of claim 10 wherein the HDC block is encoded to add each encoded training datum to class hypervectors depending on how much new information an identified pattern adds to the class hypervectors.

12. The artificial intelligence framework of claim 1 wherein the SNN is configured to update using a gradient descent rule.

13. The artificial intelligence framework of claim 12 wherein the HDC block is configured to achieve single pass learning.

14. The artificial intelligence framework of claim 1 wherein the SNN is configured to have only a single digit number of SNN layers to extract low-level spatiotemporal information of raw event-based data.

15. The artificial intelligence framework of claim 1 further configured to support online learning from an Internet data stream.

16. The artificial intelligence framework of claim 1 wherein the SNN and the HDC block are configured to be co-trained.

17. The artificial intelligence framework of claim 1 wherein the HDC block is configured to be trained based on a loss function defined at an output layer of the SNN.

18. The artificial intelligence framework of claim 1 wherein the electronic hardware block comprises a field-programmable gate array.

* * * * *